UNITED STATES PATENT OFFICE.

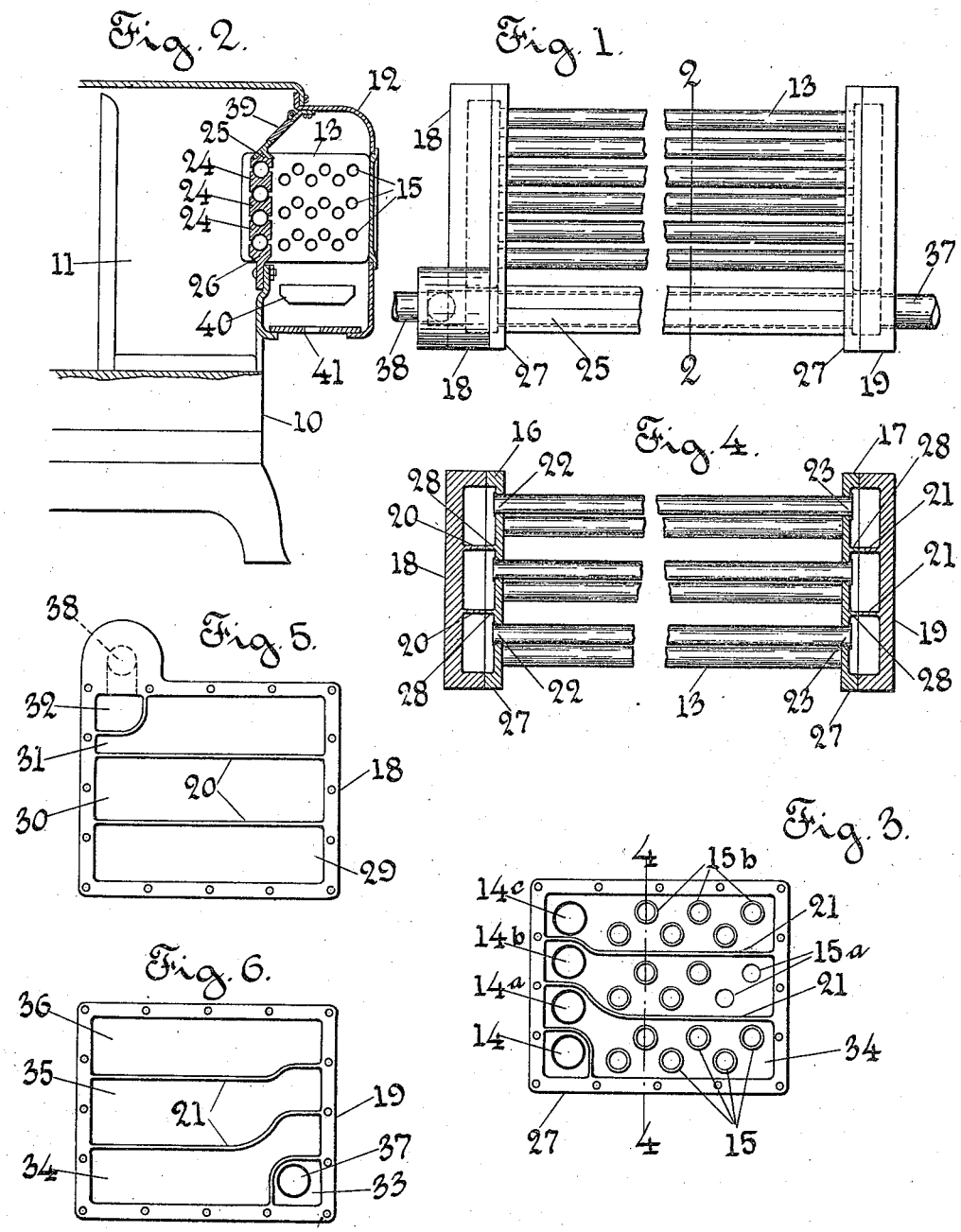

ROBERT W. ROGERS, OF WORCESTER, MASSACHUSETTS.

WATER-HEATER.

1,242,241.      Specification of Letters Patent.      Patented Oct. 9, 1917.

Application filed February 20, 1915. Serial No. 9,569.

*To all whom it may concern:*

Be it known that I, ROBERT W. ROGERS, a citizen of the United States, residing at Worcester, in the county of Worcester, State of Massachusetts, have invented a certain new and useful Improvement in Water-Heaters, of which the following is a specification, reference being had therein to the accompanying drawings.

This invention relates to water heaters, but more particularly to such as are adapted for use in combination fluid and solid fuel stoves, though the same is entirely applicable to heaters in which only one of these fuels is used. The object of the invention is to provide a structure which is more simple and efficient than any devices of a similar nature heretofore known.

Certain types of water heater construction are particularly adapted for use with solid fuel and certain other types are better suited for use with fluid fuel. For example, where water is to be heated by solid fuel in which constant heat is necessarily maintained, piping of relatively large diameter has been found to be advantageous, whereas with a fluid heater where it is desirable that the heat be applied as short a period of time as possible, smaller piping is preferable.

In the present invention a structure has been devised in which a circulation of water is maintained through a system composed of both large and small pipes, and these pipes are preferably so arranged that the large pipes are exposed to heat from the solid fuel fire box, and the small pipes are exposed to heat from a fluid fuel burner.

Many other features and advantages of the invention will be fully described hereinafter and included in the claims.

One embodiment of the invention is shown in the drawings in which:—

Figure 1 is a plan view of the invention complete.

Fig. 2, section on line 2—2 of Fig. 1, with device mounted in a stove, as well be fully described hereinafter.

Fig. 3, end view of the invention with the intake head removed, as will be fully described hereinafter.

Fig. 4, section on line 4—4 of Fig. 3.

Fig. 5, detail view of the exhaust end head detached, as will be fully described hereinafter.

Fig. 6, detail view of the intake end head detached, as will be fully described hereinafter.

In the drawings is shown a stove 10 in which there is a solid fuel fire box 11 and on the side walls of this stove 10 opposite to the fire box 11 is secured the casing 12 in which is the water heater 13 forming the present invention.

This water heater 13 here comprises a set of large pipes 14 to $14^c$ and a set of small pipes arranged in groups 15 to $15^b$ which preferably form a continuous coil so that circulation is maintained from the large to the small pipes or vice versa. These large and small pipes may be connected in a number of ways, but in order to secure simplicity of construction, it has been found to be advantageous to mount the pipes with their opposite ends seated in plates 16 and 17 respectively and to secure to these plates heads 18 and 19 respectively in which are preferably constructed vanes or partitions 20 and 21 respectively to produce a coil effect, as will be fully described hereinafter. In the present embodiment these plates 16 and 17 are provided with a plurality of perforations 22 and 23 respectively through which the extremities of the pipes pass and in the present invention the edges of the pipes are swaged to prevent their becoming accidentally released from such perforations but any other suitable method of maintaining the pipes within the plates might be substituted therefor.

While the pipes 14 to $14^c$ inclusive may be directly superimposed, it has been found to be a difficult matter to so mount them that there will be no spaces between to admit particles of ashes from the solid fuel fire box, and therefore it seemed advisable to separate them and insert blocks 24 between, preferably extending from end plate to end plate. The faces of the blocks contacting with the pipe are preferably formed concaved to fit such pipes and thus produce with the pipes a closed wall opposite to such fire box. A similar block 25 is preferably provided to fit the top face of the uppermost pipe 14 and a somewhat similar block 26 fits the under face of the lowest pipe 14 and these blocks 25 and 26 may be held by the casing 12 or in any other suitable manner.

In the embodiment of the invention shown in the drawings, the end plates 16 and 17 are each provided with a raised edge or facing 27 to contact with the opposing edge or face of the corresponding head, and flanges 28 are preferably also formed on the end faces of the plates 16 and 17 opposite to the vanes 20 and 21 in the heads 18 and 19 respectively, so that when these heads are bolted or otherwise fastened in place, a tight joint is formed between the heads and plates, and the head 18 is divided into compartments 28, 29, 30, 31 and 32 and the head 19 into compartments 33, 34, 35 and 36 each having no connection with any other compartments except through the piping.

The water enters the heater through the inlet pipe 37 and passes into the pipe 14 through which it flows to the chamber 29 in the head 18. To this chamber 29 are connected a group of small pipes 15 which connect it with the chamber 34 in the head 19 so that the water entering the chamber 29 flows backward toward the head 19 in such pipes 15. Connected to the chamber 34 is the next higher large pipe 14$^a$ which then carries the water back toward the head 18 and communicates with the chamber 30 in that head. Opening into this chamber 30 are a second group of small pipes 15$^a$ which carry the water back toward the head 19 into the chamber 35 in this head. Also connected with the chamber 35 is the large pipe 14$^b$ which conducts the water to the chamber 31 in the head 18. Opening into this chamber 31 are the third group of small pipes 15$^b$ which conduct the water to the chamber 36 in the head 19 from which it enters the uppermost of the large pipes 14$^c$, connected with the chamber 32 in the head 18, in turn directly connected to the outlet or exhaust pipe 38 from which it passes to a hot water boiler or other connection.

In the upper portion of the casing 12 is preferably formed a damper 39 which may be of any suitable type so that when the stove is being used with solid fuel this can be closed and there will be no entry of air through the water heater to the fire box above the fire. But when it is desired to use the fluid fuel, this damper can be opened and the products of combustion will pass into the regular flue of the stove.

In the lower portion of the casing 12 is mounted the fluid fuel burner 41 which may be of any desired type, but is preferably elongated so that the entire length of the small pipes 15 to 15$^b$ inclusive between the two heads should be fully heated. Air is admitted to the casing 12 preferably through openings 41 in the base of this casing.

By the use of heads divided into compartments by means of vanes or shelves therein, it is possible to use straight lengths of pipe and therefore no bending is necessary which greatly reduces the cost of construction and these heads may be readily cast, though it is usually advisable to machine the edges of such heads along the line of contact with the end plates so that a tight joint may be provided, but this is not essential. This structure produces the same effect as though there were connected to each end of the large pipes a group of small pipes, which in the present embodiment would be five in number, and to attempt to form such a junction without some similar type of head would be liable to be an expensive operation.

It will be noted that with this structure there is a continuous circulation from top to bottom of the heater and that the water in the present embodiment alternately flows through large and small pipes. The large pipes are preferably heated by both forms of fuel whereas the small pipes are merely subjected to the heat from the fluid burner.

What I claim as my invention and desire to secure by Letters Patent is:—

1. In a device of the class described, two sources of heat supply, piping of relatively large diameter exposed to heat from one of said sources of supply, and piping of smaller diameter so connected to the first pipe that fluid to be heated shall pass alternately through one kind of piping and then through the other, the smaller piping being exposed to heat from the second source of heat supply.

2. In a device of the class described, a water heater comprising, a fire box for the consumption of solid fuel, a fluid fuel burner, a plurality of fluid carrying pipe sections of relatively large diameter arranged substantially in the same plane to form a portion of one wall of said fire box, and pipe sections each composed of a plurality of pipes of relatively smaller diameter connecting certain ends of said large pipes to provide a circulation of the water alternately through large and small pipe sections, said small pipe sections being exposed to the heat of combustion from said fluid fuel burner.

In testimony whereof I affix my signature in the presence of two witnesses.

ROBERT W. ROGERS.

Witnesses:
HARTLEY W. BARTLETT,
HANNAH M. KENNEDY.

Copies of this patent may be obtained for five cents each, by addressing the "Commissioner of Patents, Washington, D. C."